(12) United States Patent
Koryakin et al.

(10) Patent No.: US 7,555,592 B1
(45) Date of Patent: Jun. 30, 2009

(54) KERNEL ACCELERATION TECHNOLOGY FOR VIRTUAL MACHINE OPTIMIZATION

(75) Inventors: Alexey B. Koryakin, Moscow (RU); Nikolay N. Dobrovolskiy, Moscow (RU); Andrey A. Omelyanchuk, Moscow (RU)

(73) Assignee: Parallels Software International, Inc., Tortola (VG)

( * ) Notice: Subject to any disclaimer, the term of this patent is extended or adjusted under 35 U.S.C. 154(b) by 507 days.

(21) Appl. No.: 11/463,339

(22) Filed: Aug. 9, 2006

Related U.S. Application Data

(60) Provisional application No. 60/710,143, filed on Aug. 23, 2005.

(51) Int. Cl.
*G06F 21/00* (2006.01)
(52) U.S. Cl. ............................... 711/6; 711/203
(58) Field of Classification Search ................ None
See application file for complete search history.

(56) References Cited

U.S. PATENT DOCUMENTS

| | | | |
|---|---|---|---|
| 6,397,242 B1 * | 5/2002 | Devine et al. ................ 718/1 |
| 7,277,999 B1 * | 10/2007 | Agesen et al. ............... 711/163 |
| 7,278,030 B1 * | 10/2007 | Chen et al. ................... 713/189 |
| 7,496,495 B2 * | 2/2009 | Solomon et al. ............... 703/26 |
| 2005/0076186 A1 * | 4/2005 | Traut ............................. 712/1 |
| 2005/0081199 A1 * | 4/2005 | Traut ............................. 718/1 |

\* cited by examiner

*Primary Examiner*—Hyung S Sough
*Assistant Examiner*—Ngoc V Dinh
(74) *Attorney, Agent, or Firm*—Bardmesser Law Group

(57) ABSTRACT

A system, method and computer program product for optimizing handling of guest code in a Virtual Machine include code for identifying, in the guest code, a predetermined pattern that includes privileged but unsafe instructions and an instruction that raises an exception; code for executing the guest code in a native mode; code for, upon encountering the instruction that raise the exception, transferring control to a Virtual Machine Monitor; code for emulating the pattern in the Virtual Machine Monitor; and code for rolling back the effects of privileged but unsafe instructions and any intervening instructions to ensure correct Virtual Machine Monitor context. The pattern can include, for example, a privileged but unsafe instruction, followed by safe instructions, followed by an exception raising instruction, followed by safe instructions, followed by a privileged but unsafe instruction. Optionally, the most frequently occurring patterns can be placed in a cache, for use by the Virtual Machine Monitor to verify their presence in the guest code.

15 Claims, 6 Drawing Sheets

KERNEL ACCELERATION TECHNOLOGY FOR VIRTUAL MACHINE OPTIMIZATION

CROSS-REFERENCE TO RELATED APPLICATIONS

This application is a non-provisional of U.S. Provisional Patent Application No. 60/710,143, filed on Aug. 23, 2005, entitled SMART KERNEL ACCELERATION FOR VIRTUAL MACHINE OPTIMIZATION, which is incorporated by reference herein in its entirety.

BACKGROUND OF THE INVENTION

1. Field of the Invention

The present invention relates generally to Virtual Machine (VM) technology and, more particularly, to methods and systems for optimization of transfers of control and segment operation in guest operating system code in VM.

2. Background Art

With VM technology, a user can create and run multiple operating environments on a computer at the same time. Each operating environment, or Virtual Machine, requires its own operating system (OS) and can run applications independently. The VM software provides a layer between the hardware of the computing system and the software that runs on it.

Frequently, the problem arises of simultaneously running different operating systems on the same hardware system. For example, with one version of MICROSOFT WINDOWS running on the computing system, it can be necessary to start another instance or another version of WINDOWS or another operating system on the same hardware system.

A typical Virtual Machine Monitor (VMM) enables a single physical machine or processor to act as if it were several physical machines. A VMM, typically jointly with a high-ranking OS (although there are VMMs that can be executed on bare hardware, without a high-ranking OS), can run a number of different operating systems simultaneously, such that each of the different operating systems has its own VM. In other words, a typical VMM can handle a number of VMs, each of which represents its own OS, and each of which can run its own application software and control or use its own hardware, including certain types of processors, I/O and data storage devices, and so on, as if they were running on a single processor. The high-ranking OS is typically referred to as a "host OS" (HOS). The multiple operating systems that are running as VMs are typically referred to as "guest operating systems" ("guest OSs") running "guest code."

A conventional approach for implementing VMs includes a VMM approach developed by IBM and implemented on mainframes, which support virtualization. Another approach includes implementing VMM on modern processors, which do not support the hardware virtualization, such as full step-by-step or page-by-page interpretation of the original code, or full binary translation of the original code, or combining binary translation of some portions of the original code and direct execution of other portions of the original code.

One of the common problems in Virtual Machine technology is the overhead that results from processing of privileged but unsafe instructions, also known as processing of "code under control." In particular, in the context of many Virtual Machine implementations, such as, for example, described in U.S. patent application Ser. No. 11/139,787, entitled METHODS AND SYSTEMS FOR SAFE EXECUTION OF GUEST CODE IN VIRTUAL MACHINE CONTEXT, filed on May 31, 2005, which is incorporated herein by reference in its entirety, the high cost of the exceptions needed to handle the privileged but unsafe instructions is of particular concern. In other words, triggering, or raising, the exceptions is one of the major sources of overhead.

One of the problems that exist in emulation of code using Virtual Machine technology (sometimes known as the "code under control" technique) is the problem of overhead associated with execution of privileged but unsafe instructions. As a practical matter, the problem of privileged but unsafe instructions is primarily an issue with execution of guest operating system code, where such instructions are frequently present in large numbers. The user application code, even when emulated, rarely has a large number of privileged but unsafe instructions, since virtually all user application code is written by developers on the assumption that it is executed in a non-privileged mode (in the INTEL architecture example, Ring 3 level), and therefore the developer of the user application code knows that attempting to use privileged instructions in the user application would only trigger exceptions and errors.

However, the guest operating system is written on the assumption that it is running at the highest privileged level, or Ring 0 in the INTEL architecture. In other words, the guest operating system running in the Virtual Machine does not know that it is a guest operating system. Rather, it thinks that it is the "real" operating system. Therefore, there are frequently a significant number of privileged but unsafe instructions in the guest operating system code. These instructions need to be emulated, since the guest code cannot be permitted to execute instructions for which it, in reality, does not have a sufficient privilege level.

Therefore, the VM is forced to emulate these instructions using additional mechanisms, e.g., INT(n) (for the software debugger approach), and execution of the guest OS code raises frequent exceptions that require handling by the Virtual Machine Monitor, and requires emulation of those privileged but unsafe instructions. This is relatively overhead-intensive. Accordingly, there is a need in the art to reduce the amount of overhead associated with handling of guest operating system code during emulation.

BRIEF SUMMARY OF THE INVENTION

The present invention is directed to methods and systems for processing of patterns of privileged but unsafe instructions in the guest code of a Virtual Machine that substantially obviates one or more of the problems and disadvantages of the related art.

In one embodiment, there is provided a system, method and computer program product for optimizing handling of guest code in a Virtual Machine, including means for identifying in the guest code a predetermined pattern that includes unsafe instructions (such as privileged but unsafe instructions, or other types of unsafe instructions) and an instruction that raises an exception; means for executing the guest code in a native mode; means for, upon encountering the instruction that raises the exception, transferring control to a Virtual Machine Monitor; means for interpretation the pattern and guest code verification in the Virtual Machine Monitor; and means for rolling back the effects of privileged but unsafe instructions and any intervening instructions to ensure correct Virtual Machine Monitor context. The pattern can include, for example, a privileged but unsafe instruction, followed by safe instructions, followed by an exception raising instruction, followed by a privileged but unsafe instruction. Optionally, the most frequently occurring patterns can be placed in a cache, for use by the Virtual Machine Monitor to verify their presence in the guest code.

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
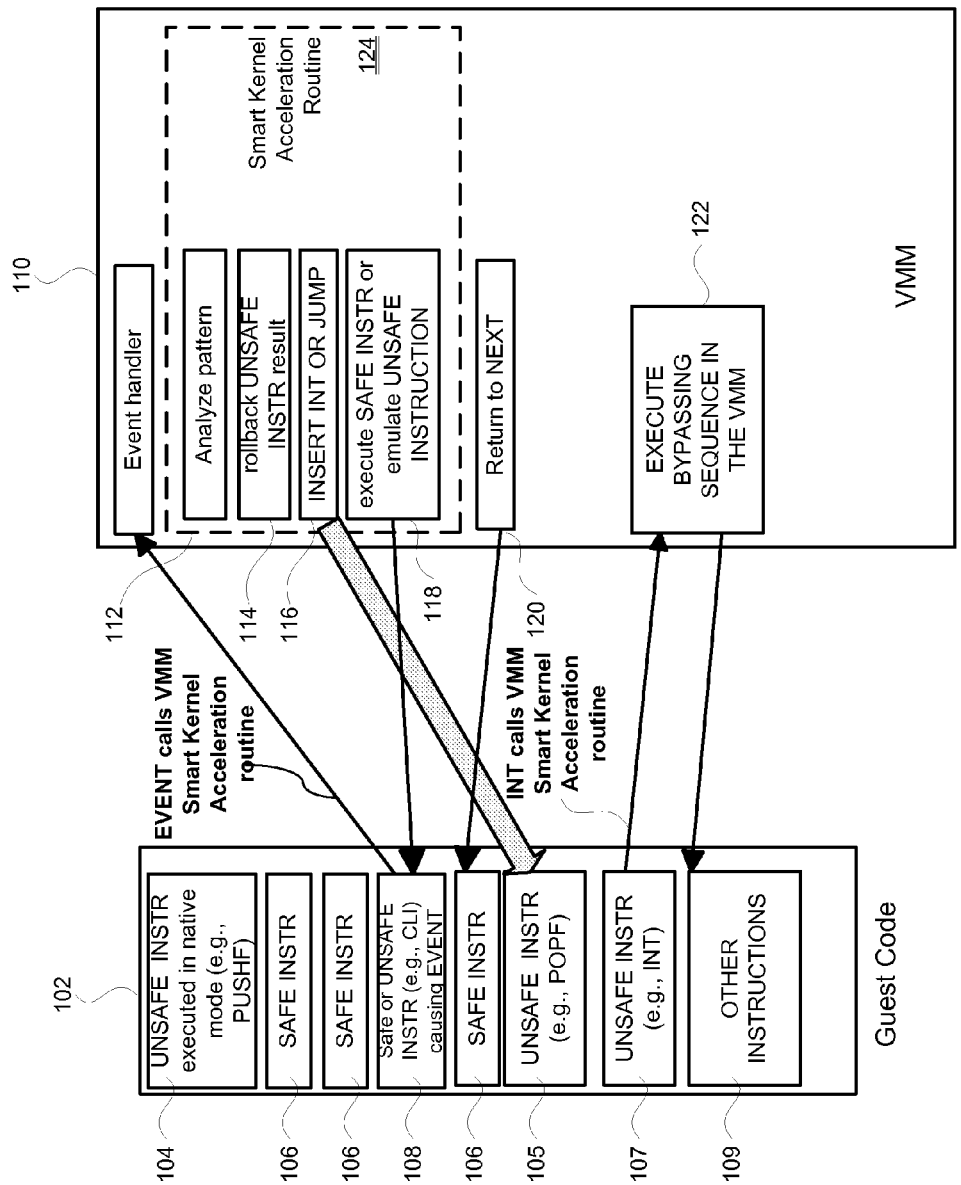
FIG. 1 illustrates an example of how kernel acceleration technology handles patterns.

Reference will now be made in detail to the embodiments of the present invention, examples of which are illustrated in the accompanying drawings.

In the remainder of this description, it is assumed that the reader is familiar with VM concepts generally, and with INTEL processor architecture and instruction set. Although particular examples relate to the INTEL architecture, the approach described herein is not limited to the INTEL architecture, and can be implemented with other processor families and processor architectures.

The techniques described herein provide an effective procedure for implementation of a VM designed for execution of user instructions and particularly instructions of the VM's OS (usually referred to as "guest OS"). Types of instructions that can be singled out in the software code to be executed in the VM include "safe instructions" and "unsafe instructions." Additionally, some kinds of instructions can be singled out in the software code if the instructions themselves are safe, but the code sequences are unsafe. Safe instructions are instructions that produce the results expected by the guest OS when executed in the VM. Unsafe instructions are instructions that produce results different from those expected by the guest OS when executed in the VM, or that are unsafe from the viewpoint of the VMM or HOS.

Additionally, some instructions can be either safe or unsafe instructions, depending on the context of their execution (including the VM context). As used herein, the term "VM context" refers to circumstances under which a computing system is used. The context settings may include hardware processor registers settings, which define instructions being executed by the hardware processor. Also, context settings may include system libraries being accessed by applications, mapped memory pages, settings of the hardware being emulated in the VM and so on. In one approach, original (i.e., source) guest code can be executed using the software debugging technique as follows:

Before execution, the VMM analyzes the original guest code. The VMM generates modified (i.e., target) guest code by replacing potentially unsafe instructions with breakpoints (e.g., INT3 or INT(n) interrupts). During execution of the modified guest code, control is transferred to the VMM at the interrupts. In turn, the VMM, depending on the state of the VM, either restarts the guest code without emulation or emulates the potentially unsafe fragment of guest code in the emulation mode.

Note that "original" guest code and "source" guest code generally refer to unanalyzed guest code, while "modified" guest code or "target" guest code generally refer to analyzed and modified guest code that has been processed (e.g., by insertion of breakpoints into the original guest code) for direct execution. In one embodiment, breakpoints can be placed directly into original code. Alternatively, breakpoints can be placed into a copy of the portion of the original code. In that case, the same absolute effective (EIP) addresses of the instructions of the target code should be maintained.

In one approach to Virtual Machines, a software debugger can be used to set up breakpoints, or interrupts, forcing the processor to raise exceptions (e.g., to prevent illegal access to memory or to input/output devices). Optionally, instructions that cause the processor to raise exceptions can be used as breakpoints.

Exception handling may be based on using a paging model of address processing by the processor, and can be implemented as follows:

1. A page of the original guest code is analyzed;
2. A copy of the page of the original guest code is created and certain unsafe instructions are replaced with breakpoints to generate a modified (analyzed) page of guest code;
3. The modified (analyzed) page of guest code is executed; and
4. During execution of the modified (analyzed) page, control is transferred to the VMM if exceptions are raised at the breakpoints, and the VMM, by analyzing the VM context, either (i) generates bypassing code, which does not contain unsafe instructions, or (ii) provides execution of the unmodified original guest code, or (iii) provides for execution of different code, which ensures that the execution of the potentially unsafe instructions becomes safe, for example, by adjusting the VM context.

In the INTEL family of processors, various "privilege levels" are different modes of operation that are characterized, e.g., by different sets of available instructions and accessed registers. Privilege levels may be set through appropriate processor registers.

The present invention addresses the problem of overhead associated with emulation of potentially executable (privileged and/or non-privileged instructions) but unsafe instructions by maintaining as much as possible of the code execution in the native mode (i.e., in a "direct execution" mode). Note also that the instructions of primary concern are those that are executable but unsafe—in other words, instructions that are privileged or non-privileged, but that do not raise exceptions when encountered in the course of execution, for example, in the context of the VM. Instructions that raise exceptions are not a problem—the exceptions are handled in the normal course of events, by switching to the Virtual Machine Monitor. It is the privileged but unsafe instructions that generate a significant overhead, since they are the reason why the code needs to be analyzed, break points added, context switched upon encountering those instructions, etc. Note also that this is a problem that is generic to virtually any processor that is not fully virtualizable, and not limited to just the INTEL processors.

The above examples described above relate to IA-32 processors, although the general concept of the invention is broader than IA-32 architecture, and can be applied, for example, to VT-I, IA-64/Itanium, AMD 64 and other hardware platforms on which virtualization/virtual machine technology can be implemented. The IA-32 platform also has instructions (e.g., CLI) that can be unsafe and generates exceptions or safe and does not generate exceptions, depending on which mode the VM context executes. Other processors can also have similar types of instructions. Therefore, the invention also relates to finding criteria of faulting such instructions and forming a corresponding VM context.

The following examples use a VM that is virtualized on ring 3 (privilege level 3), although the invention is not limited to this implementation.

The technique for reducing overhead described in this application relies on the fact that many operating systems have repeating patterns of instructions that occur throughout the code, and which raise exceptions. An example of such a pattern is the following:
PUSHF
. . .
CLI
POPF The PUSHF instruction pushes the contents of the flag registers (or bits) onto the processor stack. It is then followed by some number of "useful" instructions (the "dots" in the above sequence). It is then followed by a "clear interrupts" instruction, CLI. This is again followed by some number of "useful" instructions, and then followed by the POPF instruction, which restores the flags from the processor stack.

Normally, if using a software debugger to handle pages that contain unsafe instructions, the above sequence would be replaced in the analyzed code by the following:
INT3
. . .
INT3
. . .
INT3

In other words, with the PUSHF and POPF instructions being unsafe, as well as CLI, are all replaced by interrupts, to switch the context to the Virtual Machine Monitor for emulation.

In fact, this pattern is so common that approximately 70% of all privileged but unsafe instructions that occur in WINDOWS at runtime can be ascribed to it. Of the three instructions above—PUSHF, CLI and POPF, CLI inherently raises an exception, but PUSHF and POPF do not—they are privileged but unsafe. The empirical observation on which the present approach is based is that instructions that raise exceptions (such as CLI) are frequently accompanied by privileged but unsafe instructions that do not. The converse of this may also be true—instructions that are privileged but unsafe are frequently accompanied (in the sense of being "not too far" from them) by instructions that raise exceptions.

Applying this to the example above, the pattern PUSHF . . . CLI . . . POPF is frequently found in WINDOWS code, with the number of "useful instructions" (represented by the " . . . ") being relatively small, in other words, the pattern is not scattered throughout the address space, but is typically relatively compact. Another way to phrase this empirical observation is that it is a practical impossibility to write operating system code in a manner that has only privileged but unsafe instructions, and that does not also contain instructions that are guaranteed to raise exceptions.

The empirical observation discussed above allows for the execution of the code that contains the above pattern in a native mode, relying on the fact that there is no need to raise an exception at PUSHF and POPF, since there is guaranteed to be an exception raised at CLI. The CLI instruction is therefore referred to as a "tie point," or a "reference point." The Virtual Machine Monitor is guaranteed to be invoked upon encountering the CLI instruction (but not PUSHF), and the VMM then can analyze the code, determine whether a PUSHF instruction took place, analyze the rest of the code, and then determine how to handle the situation of a privileged but unsafe instruction that occurred recently but did not raise an exception.

It should also be understood that compactness of the patterns is a relative concept, and the invention is not limited to any particular number of instructions between the (for example) the PUSHF instruction, and the reference point. Obviously, the more compact the pattern, the more efficient the scheme, and the less overhead it will generate. Conversely, the greater the "distance" between the privileged but unsafe instruction and the reference point, the greater the computational effort required to roll back the effects of an "incorrectly" executing the privileged but unsafe instruction. However, even when the distance is large, for example, hundreds or thousands of instructions, it is still possible to, in most cases, to roll back the effects of the erroneously executed instruction.

It is worth noting that this approach is generally kernel-specific, in other words, it is usually necessary to know which guest operating system kernel is running in the Virtual Machine. The set of patterns that are present in WINDOWS code is usually different from the set of patterns present in LINUX code. Considering the two kernels as examples, some of the patterns are common to both of them, some patterns are generally found only in WINDOWS, and some only in LINUX. Also, the statistical distribution of the frequency of occurrence of the patterns is not the same among the various OS kernels. The PUSHF-CLI-POPF example is used in this discussion because it occurs frequently in both WINDOWS and LINUX.

Although the most common situation is where an exception raising instruction, such as CLI, occurs between two unsafe instructions, other situations can also be viewed as a pattern. For example, the situation of
PUSHF
. . .
CLI
or, as an alternative example,
CLI
. . .
PUSHF or POPF
can be viewed as a pattern. In other words, only one of the two privileged but unsafe instructions is close to the exception-raising instruction. Nonetheless, upon encountering the CLI, and switching the context to the Virtual Machine Monitor, the VMM can analyze the surrounding instructions to see if a rollback is necessary, or if a privileged but unsafe instruction is coming in the immediate future, and whether some action, such as emulation, needs to be taken.

The VMM can also cache privileged but unsafe instruction for future reuse, without analyzing them (using protected points tied to corresponding guest code instructions—for example, one to each unsafe protected instruction).

One of the reasons why this approach works well is that in actuality, the number of such patterns in most operating systems code is relatively finite, typically on the order of 20 or 30, and almost never more than 100. Statistically, a small handful of such patterns accounts for the vast majority of patterns that are actually encountered during execution. The PUSHF-CLI-POPF example is the most common, accounting for about 70% of the WINDOWS code patterns. This means that it is relatively straightforward to have a small table, or small database, to which the Virtual Machine Monitor can refer, upon encountering an exception, such as CLI.

Normally, each particular operating system kernel needs to be analyzed, and statistics regarding the patterns present in its code gathered. Then, a table, or database, can be built up, that includes those patterns. It should also be noted that over time, as the operating system code evolves, and new versions of the operating systems or drivers are released, these patterns can change, with new patterns showing up, and some of the old patterns becoming less used. Therefore, for each new version of the operating system or driver containing unsafe instructions, it is preferred that statistical analysis be performed, to ascertain the patterns within that code.

In other words, the appearance of new patterns (either due to new versions of the operating system, or due to new drivers being added to the operating system, etc.) is somewhat analogous to the way viruses are handled by anti-virus software vendors—upon the appearance of a new virus, its "signature" is analyzed and is added to the anti-virus database, together with a appropriate protocol for handling this virus. The next release of the antivirus software therefore incorporates the knowledge about the newly-appeared virus. The situation with the pattern signatures in this context is analogous.

Another empirical observation that enables the process to work is the fact that the patterns tend to be relatively compact. In other words, the number of "useful" instructions between the privileged but unsafe instruction (such as PUSHF) and the CLI interrupt is relatively small. It is theoretically always possible to find and interrupt somewhere down the line for every privileged but unsafe instruction, but if that interrupt were thousands, or tens of thousands, of instructions further down in the code, rolling back the effects of so many already-executed instructions might be very difficult, or extremely overhead intensive, or even impossible. However, the fact that the patterns tend to be relatively compact means that rolling back the execution of the "useful" instructions and then "fixing" the VMM context that might be "broken" due to an improper execution of the PUSHF instruction in the ring 3 privilege level is possible.

If detection of some unsafe instructions that do not generate "events" is impossible (for example, it is difficult to determine which event this instruction is connected to), the VMM can temporary switch to standard guest code execution mechanism (for example, the software debugger) for handling these instructions.

Note also that each such pattern typically requires its own algorithm for handling both the emulation of the relevant privileged but unsafe instructions, as well as the rollback that fixes the context of the VMM.

Note also that not every situation involving execution of privileged but unsafe instructions in the ring 3 mode necessarily leads to a "broken" VMM context. For example, the PUSHF and POPF instructions affect 20 flags of the INTEL processor, but only some of those flags might be ones that are actually used by either the VM or the VMM. Thus, execution of the PUSHF/POPF instructions even in ring 3 privilege level does not necessarily lead to a "broken" VMM context, and the VM can frequently continue execution of the instructions as if nothing untoward happened.

Another situation that needs to be considered is the case where the privileged but unsafe instruction, such as PUSHF, does not have any nearby exception raising instructions. One way to address this issue is by adding artificial reference points to the analyzed code, such that the artificial reference points are close to the patterns of privileged but unsafe instructions. This, in effect, creates a "synthetic" or artificial pattern. To the extent that the artificial reference points are close enough for rollback to be relatively easy, and to the extent that several privileged but unsafe instructions are "handled" for the price of a single exception and rollback, this may be more efficient than simply replacing privileged but unsafe instructions with INT(n) break points.

One additional optimization that can be done uses the fact that of all the patterns that are encountered in a particular kernel, there is a handful of patterns that account for a "lion's share" of the patterns that are actually encountered during execution. For example, as noted above, the PUSHF-CLI-POPF (in most cases PUSHF, CLI-POPF) pattern accounts for about 70 percent of those encountered. For the WINDOWS XP kernel, this pattern accounts for about 90 percent of the encountered patterns. Therefore, to further speed up the process of handling patterns, the most frequently encountered patterns can be cached, rather than keeping them in a database.

Another type of hard-to-detect pattern can be handled by a specially added artificial event, or, alternatively, during VMM's code analysis stage. An example of such a pattern in WINDOWS is MOV [XXX], CS . . . MOV [YYY], SS sequence. This pattern does not generate "events," and, therefore, VMM detects all such corresponding instructions during the code analysis (the software debugger guest code execution mode, or another guest code execution scheme that looks at the guest code as a preliminary step).

Another empirical observation relates to the INTEL architecture, and particularly to the CLI (Clear Interrupt Flag) and STI (Set Interrupt Flag) instructions, which permit interrupts, and forbid interrupts, respectively. These instructions are found very frequently in operating system code, particularly when the operating system needs to manipulate certain registers and has to temporarily forbid interrupts. These instructions are therefore useful for pattern identification. However, only a small fraction of these instructions are used in connection with the patterns. Approximately 95 percent of these instructions are actually used for other purposes, and generate a significant overhead due to the exceptions that are raised. The INTEL processor has a provision for handling these instructions without raising the exceptions, by looking not at the interrupt flags, but at the virtual interrupt flags. Thus, to the extent that a reference point is still necessary (while the raising of exceptions by CLI and STI is disabled), some other mechanism of raising exceptions when patterns are encountered needs to be used, for example, using INT(n) to generate an interrupt due to the original instruction (the central or reference instruction in the pattern).

Note also that executing CLI and STI instructions in a native mode can result in a fairly significant improvement in performance, because the overhead associated with exceptions raised by these instructions is quite substantial. For example, WINDOWS XP executing as a VM with CLI/STI in a native mode increases overall performance by roughly a factor of two. However, the issue of what to do with the patterns then needs to be addressed, for example, by replacing the PUSHF-CLI-POPF pattern with, e.g., PUSHF-INTI-POPF.

This approach (enabling CLI/STI native execution) can be extended to the more general case. If the VMM uses an artificial environment for "event" generation, there comes a time when the VMM has detected all the patterns connected with this environment, and can switch to an execution environment where fewer events occur. For example, consider a 100 KB "chunk" of guest code that has been analyzed. In the first 5 KB of code, there might be PUSHF-CLI-POPF sequences, however, in the remaining 95 KB, there are no such sequences, or any other patterns that contain privileged but unsafe instructions. Therefore, in the last 95 KB, CLI and STI can be executed in the native mode, without a need for emulation, or for raising exceptions.

The process is generally as follows: an unsafe instruction, such as PUSHF is executed in a native mode. Then a number of safe instructions can be executed. Then some exception-raising instruction (either CLI, or some other instruction, where the VMM context has been tuned to recognize it as an "event") is encountered. The event calls the Virtual Machine Monitor, where the pattern of instructions surrounding event is analyzed (as an additional optimization, VMM can cache such locations and reuse already cached information without pattern analysis). If necessary, the results of the unsafe instruction are rolled back, and the safe instructions following the unsafe instruction executed. An interrupt, breakpoint, or jump to a stub is inserted on the unsafe instructions that follow the event (note that the VMM does this only if the pattern requires this step). The safe instructions following the event can then be executed, and/or the unsafe instruction, such as POPF, can be executed or emulated. Control then returns to the next safe instruction.

Execution of other instructions continues, until an unsafe instruction that triggers switching control to the Virtual Machine Monitor is executed. In this case, such an instruction can be an interrupt (INT(n)). The VMM executes a bypassing sequence, emulating the effects of the INT. Control then returns to other instructions following the INT.

FIG. 1 illustrates one example of how patterns in the guest code 102 can be handled. As shown in FIG. 1, the guest code 102 includes an unsafe instruction 104, which is executed in the native mode. Examples of these are PUSHF, POPF, etc. The PUSHF instruction 104 is followed by two safe instructions 106. They are then followed by an instruction 108 that causes an event. An example of such instruction is the CLI or STI instruction. The event-causing instruction 108 is followed by a safe instruction 106, which is then followed by an unsafe instruction 105, in this case, the POPF instruction. The PUSHF-CLI-POPF therefore form a pattern, as discussed earlier. The pattern is then followed by another unsafe instruction 107, such as an interrupt, and then followed by other instructions 109.

FIG. 1 also illustrates the interaction between the guest code 102 and the Virtual Machine monitor 110. The Virtual Machine monitor 110, upon an exception raised at instruction 108, will start an exception handler 124, and will analyze the pattern of instructions surrounding the instruction 108 (see 112). The VMM 110 then will roll back the effects of the erroneously executed unsafe instruction 104 (in this case, the PUSHF instruction), see 114. The VMM 110 will then insert an interrupt or a jump at the POPF instruction 105. As another option, the VMM can execute the safe instruction 106, or can emulate the unsafe instruction (see 118). The return from the VMM 110 to the guest code 102 will lead to the safe instruction 106, see 120. Also, with regard to the other unsafe instructions, such as 107, those instructions will raise an interrupt, which will be handled by the VMM 110, where the VMM can execute a bypassing sequence (see 122).

Figure 2:
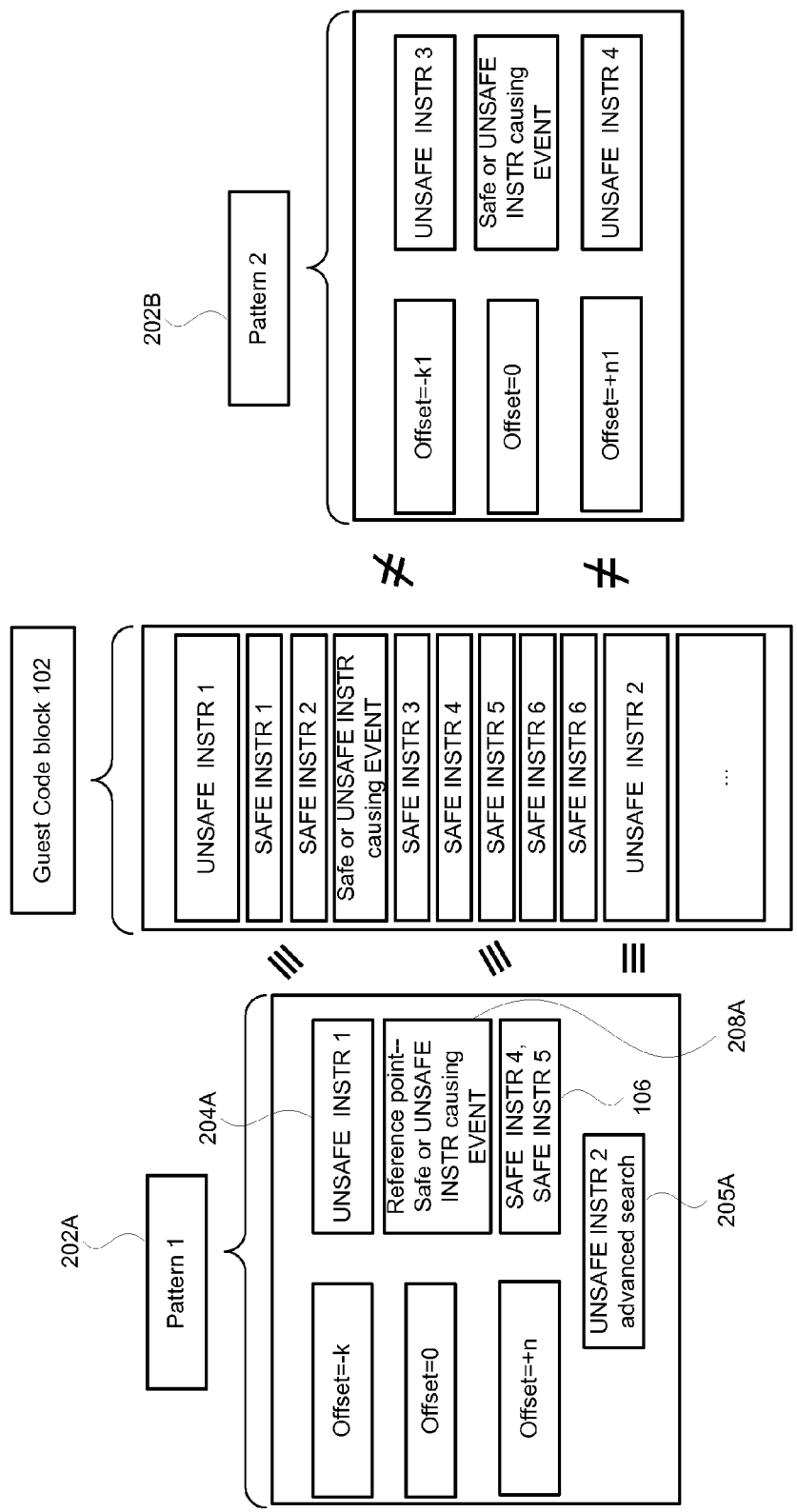
FIG. 2 illustrates various types of exemplary patterns that may be found and the theory behind pattern detection.

FIG. 2 illustrates various types of exemplary patterns that may be found by the code analysis. The VMM is presumed to know all patterns for executed guest OS code. For example, pattern 1 shows an example of a reference point, with unsafe instructions bracketing the reference point at offsets −k and +n. Here, UNSAFE INSTR 2 instructions for pattern 1 are detected by an advanced search algorithm in the VMM (see 112 in FIG. 1), for example, by comparing the pattern with a set of patterns in a small database. Pattern 2 demonstrates the simple pattern with signatures only (for the pattern detection).

The process of handling events in the Virtual Machine Monitor involves the following: upon being triggered, the exception handler in the Virtual Machine Monitor analyzes the instruction that caused an event, and the surrounding code. If no signature of a pattern is found, the normal VMM processing of such an event, such as an exception, is then invoked. The instruction is processed/emulated, and control returns to the guest code.

If a signature of a pattern is found, then the effects of the previously executed unsafe instruction need to be rolled back, the remainder of the instructions executed, the guest code updated by placing a breakpoint, and control returns to the guest code.

Figure 3:
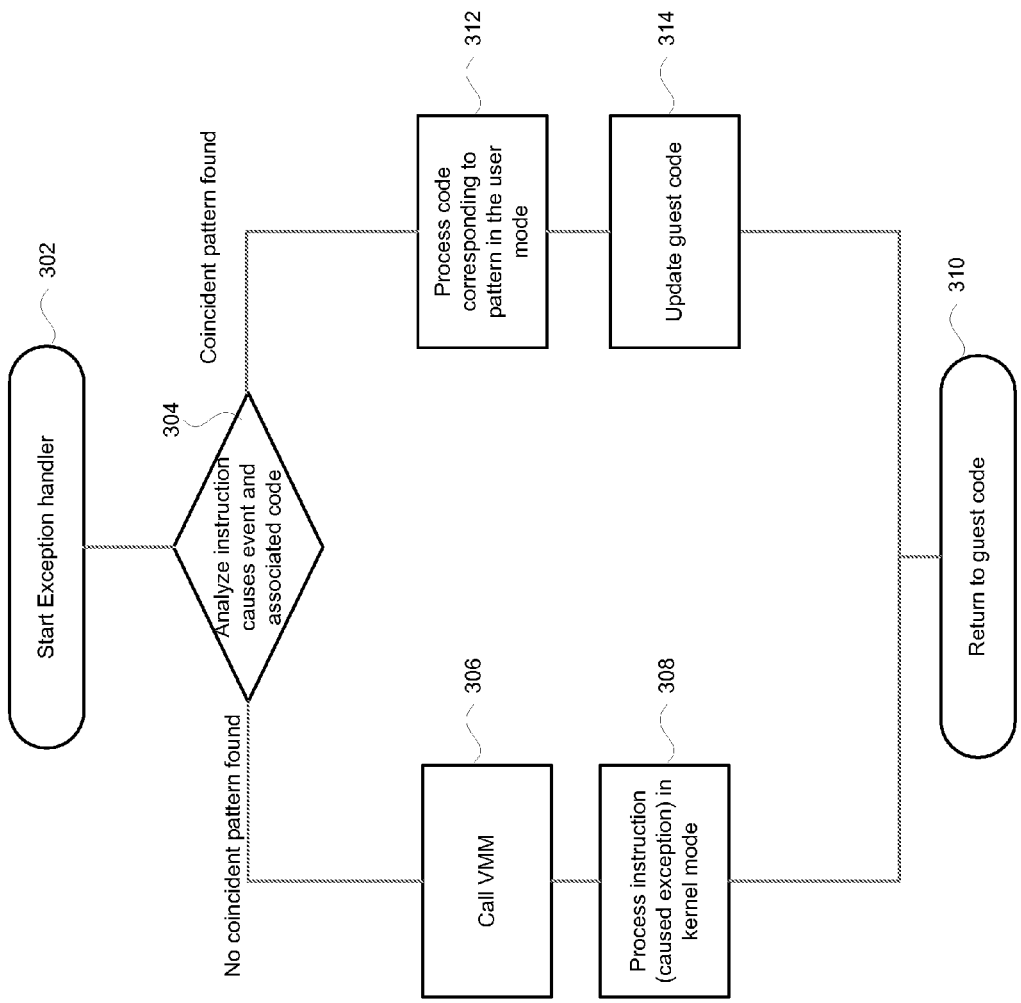
FIG. 3 illustrates the process of handling events in the Virtual Machine Monitor from the point of view of Smart Kernel Acceleration.

FIG. 3 illustrates how the VMM 110 handles events triggered by the guest code 102. As shown in FIG. 3, once the VMM is active and the exception handler 124 is started in step 302, the exception handler then analyses the instruction that caused the event, and the guest code 102 in the neighborhood of the instruction that triggered the event. If a pattern that the exception handler 124 recognizes is not found, then the VMM 110 is called, in step 306. The instruction that caused the exception is then processed, for example, by emulation, see discussion of instruction 107 earlier. The control is then returned to the guest code 102, in step 310. If, in step 304, a pattern has been identified, then, in step 312, the kernel acceleration routine of the VMM 110 will process the pattern, taking care of any roll backs, etc. The guest code is then updated in step 314 by adding a breakpoint at the unsafe instruction, if necessary, and control is then returned to the guest code 102, in step 310.

Thus, there are at least two approaches to pattern detection. The first uses existing exceptions in the neighborhood of the pattern. This is illustrated by examples 1.1-1.3 below:

Example 1.1

. . .
PUSHF (unsafe, no exception generated)
CLI (unsafe, general purpose exception generated)
. . .
POPF (unsafe, no exception generated)
. . .
Here, CLI, when executed in ring 3, raises a general purpose exception. The exception is handled in the VMM, the pattern detected, the CLI instruction emulated and PUSHF rolled back.

Example 1.2

. . .
LGDT (unsafe, exception generated)
. . .
CPUTD (unsafe, no exception generated)
. . .
This is Replaced with:
. . .
LGDT (unsafe, exception generated)
. . .
INT n (exception generated)
. . .

The LGDT instruction, in ring 3 mode, raises a general purpose exception. The exception is handled in the VMM, the pattern detected, the LGDT instruction is emulated, CPUID is emulated (rolled back) after the exception triggered at INT n.

Example 1.3

. . .

MOV EAX, [data from non-present page] (safe, page fault generated)

. . .

SGDT (unsafe, no exception generated)

. . .

The MOV instruction from a non-present page raises a push flags exception. The page fault is handled in the VMM, the pattern detected, the SGDT instruction emulated, and any rollbacks are performed.

The second approach uses synthetic exceptions in the pattern neighborhood. This requires inserting breakpoint directly inside the pattern (for example, INT 1 can be used for this purpose), and tuning the VM context to force some instructions in pattern neighborhood to raise an exception Example 2.1

Before Analysis:

. . .

PUSHF (unsafe, no exception generated)

. . .

POPF (unsafe, no exception generated)

. . .

After Analysis:

. . .

INT1 (unsafe, Debug Exception generated)

. . .

POPF (unsafe, no exception generated)

. . .

Here, INT1 is placed over one of the unsafe instructions in the pattern.

Example 2.2

Before Analysis:

. . .

PUSHF (unsafe, no exception generated)
MOV AX,8 (safe, no exception generated)
MOV DS, AX (safe, no exception generated)
POPF (unsafe, no exception generated)
After Analysis:

. . .

PUSHF (unsafe, no exception generated)
MOV AX,8 (safe, no exception generated)
MOV DS, AX (safe, "NOT PRESENT" exception generated)

. . .

POPF (unsafe, no exception generated)

. . .

By turning the VM context, the present bit can be cleared for particular descriptor in Global Descriptor Table (GDT), and a subsequent descriptor load will raise the NOT PRESENT exception, giving the opportunity to detect and bypass/emulate/rollback the pattern.

Pattern types for some exemplary OSs for the Intel architecture are shown below.

| Pattern type | Execution frequency (%) |
|---|---|
| WINDOWS XP | |
| PUSHF − CLI − POPF | ≈99.5 |
| PUSHF, PUSH CS | ≈0.5 |
| MOV [XXX], CS − MOV [YYY], SS, PUSHFD | <0.01 |
| MOV [XXX], CS − MOV [YYY], SS | <<0.01 |
| PUSHFD, SUB ESP, XXX | <<0.01 |
| XOR EAX, EAX, CPUID | <<0.01 |
| PUSHF/POPF/CPUID | <<0.01 |
| SUSE Linux 5.0 | |
| PUSHF − CLI − POPF | ≈99.8 |
| PUSHF − POPF | ≈0.2 |

Note further that privileged instructions being executed in a non-privileged ring (or privilege level) in the context of the VM will usually raise an exception. In those cases where a privileged instruction does not raise an exception, its effect would need to be handled differently, for example, by a rollback.

Figure 4A:
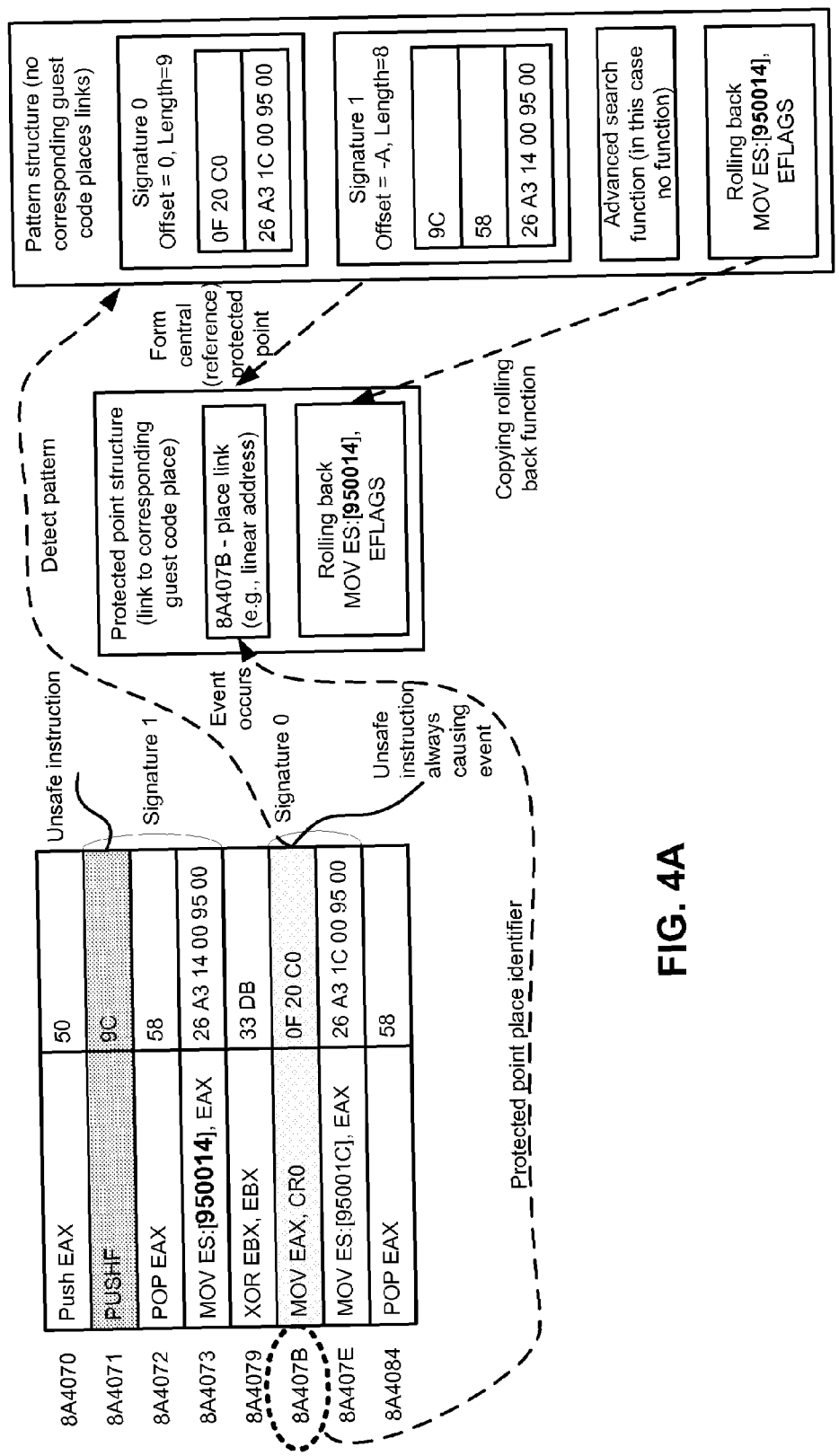
FIGS. 4A-4B illustrates one exemplary implementation of how protected (reference) points can be placed within the guest code.
Figure 4B:
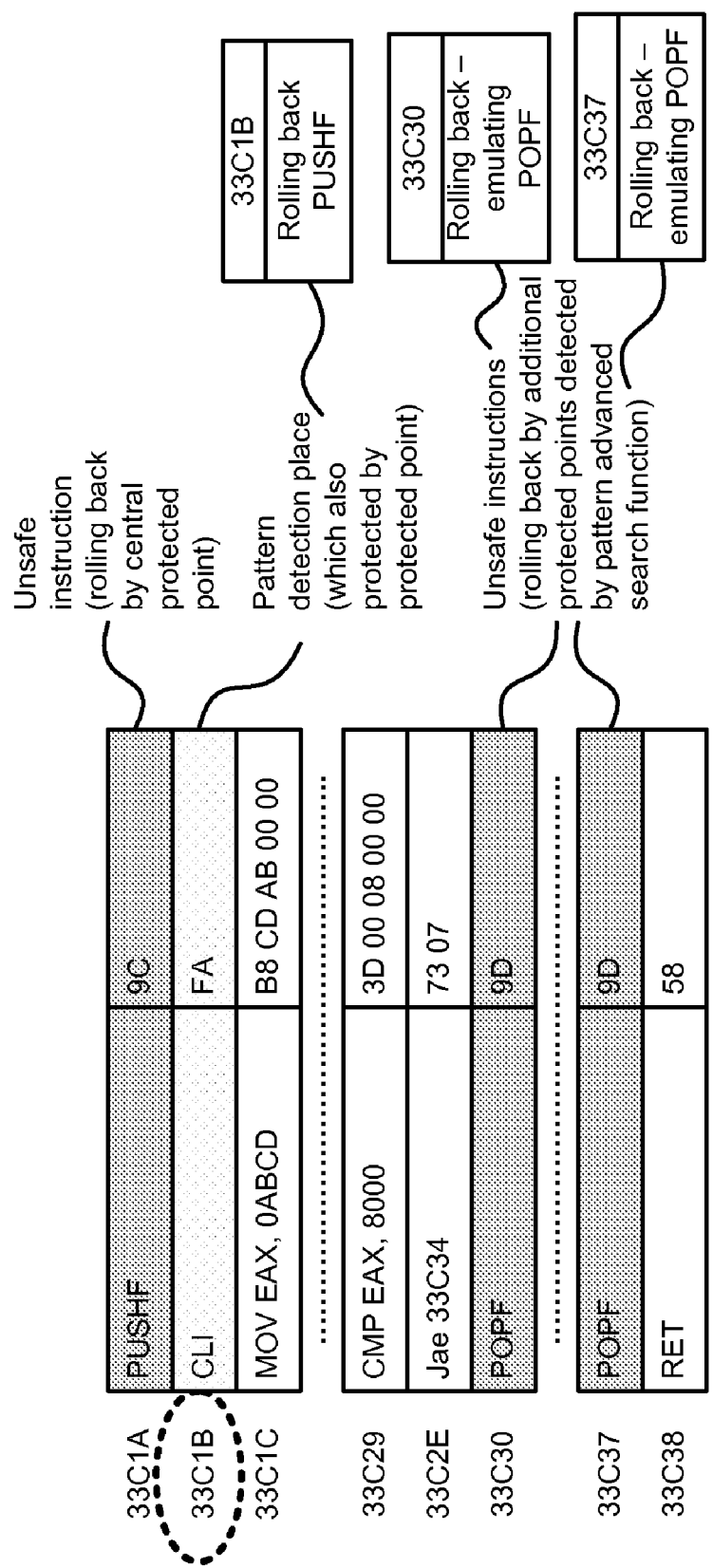

FIGS. 4A and 4B illustrate examples of how the smart kernel acceleration works, using some sample code fragments. As shown in FIG. 4A on the left, the guest code assembly language mnemonics and the corresponding up codes are illustrated. In this case, at address 8A4070, the guest code executes a PUSH EAX instruction, with an opcode of 50. This is a safe instruction.

The next instruction at 8A4071 is the PUSHF (push flags) instruction, with an opcode 9C. This instruction is unsafe, and it is worth noting that the operation of the instruction is different depending on whether it is executed in Ring0 or Ring3. The fully privileged execution of the PUSHF instruction takes 4 bytes of the flags, and pushes them onto the processor stack. If the instruction were executed in Ring3, only some of the flags are pushed down onto the stack, but not all the flags. Therefore, if the guest OS running inside the Virtual Machine were to execute the PUSHF instruction, the actual consequences of this would be to push only half of the flags onto the processor stack, not the four full bytes of the flags that the guest OS expects.

The next instruction is the POP EAX instruction, which loads the EAX register with the last 4 bytes that were pushed onto the stack. Note that this instruction would execute "incorrectly" by the guest operating system, if all the instructions thus far were being executed in the native mode, because the content of the processor stack is not what the guest OS expects, since the PUSHF instruction was executed incorrectly.

The next instruction is the MOV ES: [950014], EAX instruction, which moves the contents of the EAX register to a memory location 950014. This instruction will also execute incorrectly, because the content of the EAX register at this point is incorrect.

The next instruction at address 8A4079 is an XOR instruction, which is a safe instruction and executes correctly. The next instruction, at address 8A407B, is the MOV EAX, CR0 instruction, which moves the contents of the EAX register to control register 0. This is a privileged instruction, and will trigger a general protection fault. This instruction is therefore a reference point, or a tie point. The Virtual Machine monitor is invoked, at the MOV EAX, CR0 instruction, the instruction pattern is identified by the VMM as "signature 0", having an offset of 0 (in other words, the pattern is located at address 8A407B in this case), and a length 9 of the pattern, in other words, the pattern encompassing the MOV EAX, CR0 instruction and the instruction that follows it.

Also, the VMM can check the code in the neighborhood of the reference point, to identify the pattern designated by signature 1. This pattern located at an offset of minus A (hex), in other words, starting at address 8A4071, the pattern having a length of 8 bytes, as shown on the right of FIG. 4A. As a further option, some additional customized searches can be performed (i.e., once the simple byte-by-byte comparison is done, a more complex search, such as searching for a POPF within a certain number of bytes, can be done).

The VMM will then roll back the effects of the incorrectly executed PUSHF instructions, and control will return to the guest code, to instruction MOV ES:[95001C], EAX.

It will be appreciated that since the objective is to optimize performance of the Virtual Machine, there is a balancing that takes place between executing as much code as possible in the native mode, but rolling back the effects of incorrectly executed instructions, and simply triggering exceptions at unsafe instructions, as would have been the case with the PUSHF instruction at 8A4071. The proposed approach is particularly advantageous where the neighborhood of the reference point that needs to be analyzed is relatively local, and the roll back relatively simple. If the rollback itself is relatively time consuming, then the benefits that accrue from native execution of unsafe instructions obviously become less pronounced.

Furthermore, it would be appreciated that for this approach to work, there must be a guarantee that the roll back is always possible—if the guest code were to produce an erroneous result while executing in the native mode, and such results could not be reversed, then this would normally be unacceptable. In practice, this means that either a reference point needs to be placed closer to the "offending" unsafe instruction, to ensure that roll back were possible, or, alternatively, the "offending" unsafe instruction would have to be handled by some other means, for example, through raising an exception at its address.

FIG. 4B illustrates another example of guest code fragment, where reference points are located relatively close to a detectable pattern. As shown in FIG. 4B, an unsafe PUSHF instruction is immediately followed by the clear interrupts (CLI) instruction, at address 33C1B. The CLI instruction, executed on the Ring3 privilege level, triggers a general protection fault, and the VMM can identify the pattern, and roll back the effect of the incorrectly executed PUSHF instruction. Several instructions down, a POPF instruction is encountered, at address 33C30. In the absence of the close by reference point, this instruction can be emulated. Alternatively, if a reference point were placed after it, then its effects can be rolled back. Similarly, the unsafe POPF instruction at address 33C37 does not have a nearby reference point—in this case, it would have to be emulated. If a reference point were placed, for example, following the RET instruction at address 33C38, then the POPF instruction can be handled through roll back.

Figure 5:
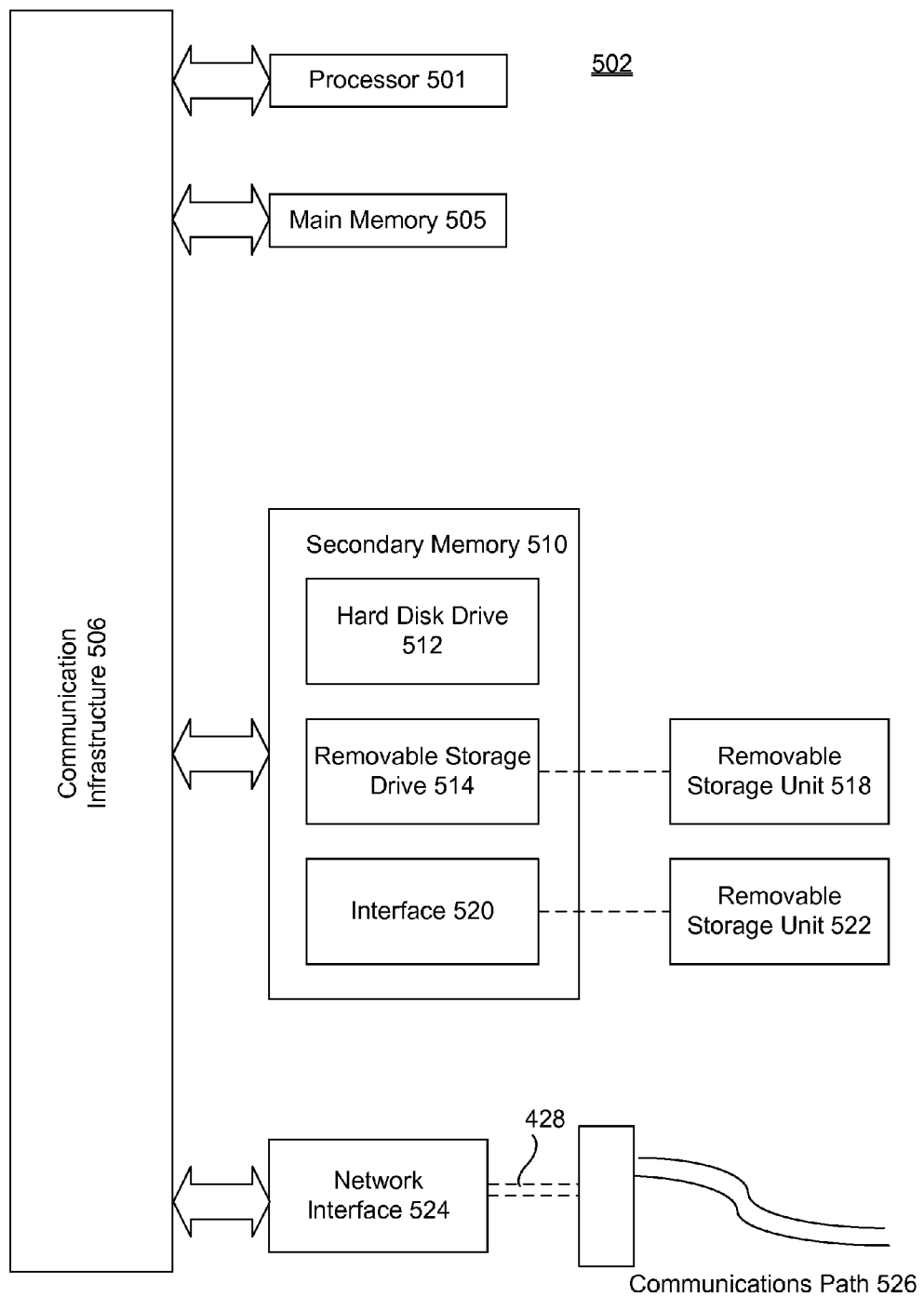
FIG. 5 illustrates an exemplary computer system on which the invention may be implemented.

An example of the computing system 502 on which the invention may be implemented is illustrated in FIG. 5. The computing system 502 includes one or more processors, such as processor 501. The processor 501 is connected to a communication infrastructure 506, such as a bus or network. Various software implementations are described in terms of this exemplary computer system. After reading this description, it will become apparent to a person skilled in the relevant art how to implement the invention using other computer systems and/or computer architectures.

Computing system 502 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, or other storage medium that is READ by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computing system 502. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to computing system 502.

Computing system 502 may also include one or more communications interfaces, such as communications interface 524. Communications interface 524 allows software and data to be transferred between computing system 502 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 501. Information representing processed packets can also be sent in the form of signals 528 from processor 501 through communications path 526.

The terms "computer program medium" and "computer usable medium" are used to generally refer to media such as removable storage units 518 and 522, a hard disk installed in hard disk drive 512, and signals 528, which provide software to the computing system 502.

Computer programs are stored in main memory 508 and/or secondary memory 510. Computer programs may also be received via communications interface 524. Such computer programs, when executed, enable the computing system 502 to implement the present invention as discussed herein. In particular, the computer programs, when executed, enable the processor 501 to implement the present invention. Where the invention is implemented using software, the software may be stored in a computer program product and loaded into computing system 502 using removable storage drive 514, hard drive 512 or communications interface 524.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for optimizing handling of guest code in a Virtual Machine, comprising:
    identifying, in the guest code, a predetermined pattern that includes unsafe instructions and an instruction that causes an event;
    executing the guest code in a native mode;
    upon encountering the instruction that raises an exception, transferring control to a Virtual Machine Monitor;
    in the Virtual Machine Monitor, detecting the pattern; and
    rolling back effects of privileged but unsafe instructions and any intervening instructions to ensure correct guest OS (Operating System) code context.

2. The method of claim 1, wherein the pattern includes a privileged but unsafe instruction, followed by safe instructions, followed by an exception raising instruction, followed by safe instructions, followed by a privileged but unsafe instruction.

3. The method of claim 1, further comprising placing most frequently occurring patterns in a cache, for use by the Virtual Machine Monitor to verify pattern presence in the guest code.

4. The method of claim 1, wherein the event is any of an exception, a software interrupt, and a break in the guest code native execution.

5. A method for optimizing handling of guest code in a Virtual Machine, comprising:
    analyzing guest code to detect recurring patterns that include privileged but unsafe instructions and instructions that raise exceptions;
    replacing privileged but unsafe instructions that are outside the patterns with breakpoints that raise exceptions;
    associating each pattern with a handler in a Virtual Machine Monitor such that the handler
    emulates the instructions in the patterns that raise the exceptions; and
    rolls back effects of execution of any prior privileged but unsafe instruction that was executed in Virtual Machine context.

6. The method of claim 5, further comprising inserting instructions that raise exceptions into the analyzed code, near privileged but unsafe instructions that otherwise do not have, in their neighborhood, an instruction that raises an exception.

7. The method of claim 6, further comprising setting the Virtual Machine Monitor to treat at least one instruction that otherwise does not raise exceptions as one that raises an exception.

8. The method of claim 5, wherein the replaced instructions are emulated.

9. The method of claim 5, wherein the replaced instructions are rolled back.

10. The method of claim 9, wherein the replaced instructions are prior to the pattern.

11. A method for optimizing handling of guest code in a Virtual Machine, comprising:
    generating a list of predetermined patterns that includes code sequences containing executable but unsafe instructions and an instruction that raises an exception;
    executing the guest code in a native mode;
    upon encountering the instruction that raises the exception, transferring control to a Virtual Machine Monitor;
    in the Virtual Machine Monitor, identifying whether the instruction that raises the exception belongs to one of the patterns;
    executing, in the Virtual Machine Monoitor, bypassing code sequences that have the same effect as the pattern; and
    rolling back effects of the unsafe instructions and any intervening instructions to ensure a correct Virtual Machine context.

12. The method of claim 11, further comprises replacing, in the guest code, unsafe instructions with instructions that raise exceptions.

13. The method of claim 11, wherein the instructions that raise exceptions is followed by the unsafe instructions.

14. A method for optimizing handling of guest code in a Virtual Machine, comprising:
    analyzing guest code to detect patterns that include privileged but unsafe instructions;
    associating each pattern with a corresponding instruction that is defined to raise an exception;
    associating each pattern with a handler in a Virtual Machine Monitor such that the handler:
    emulates the instructions that raise the exceptions, and
    rolls back effects of execution of any prior privileged but unsafe instruction that was executed in Virtual Machine context; and
    upon reaching a portion of guest code that does not contain any patterns, un-defining the corresponding instruction from raising an exception.

15. A computer useable storage medium having computer program logic recorded thereon for executing on a processor for handling transfers of control in a Virtual Machine, the computer program logic comprising:
    computer program code for identifying, in the guest code, a predetermined pattern that includes privileged but unsafe instructions and an instruction that raises an exception;
    computer program code for executing the guest code in a native mode;
    computer program code for, upon encountering the instruction that raise the exception, transferring control to a Virtual Machine Monitor;
    in the Virtual Machine Monitor, computer program code for emulating the pattern; and
    computer program code for rolling back effects of privileged but unsafe instructions and any intervening instructions to ensure correct Virtual Machine Monitor context.

* * * * *